United States Patent
Nusskern et al.

(10) Patent No.: US 6,840,700 B1
(45) Date of Patent: Jan. 11, 2005

(54) MECHANICAL CONNECTING ELEMENT

(75) Inventors: Hans Nusskern, Pforzheim-Huchenfeld (DE); Viktor Dahm, Pforzheim (DE)

(73) Assignee: G. RAU GmbH & Co. KG, Pforzheim (DE)

( * ) Notice: Subject to any disclaimer, the term of this patent is extended or adjusted under 35 U.S.C. 154(b) by 0 days.

(21) Appl. No.: 09/743,738

(22) PCT Filed: Jun. 5, 1999

(86) PCT No.: PCT/DE99/01691

§ 371 (c)(1),
(2), (4) Date: Jan. 16, 2001

(87) PCT Pub. No.: WO00/06917

PCT Pub. Date: Feb. 10, 2000

(30) Foreign Application Priority Data

Jul. 30, 1998 (DE) .......................... 198 34 305

(51) Int. Cl.[7] .............................. F16B 7/04; F16B 1/00
(52) U.S. Cl. ....................... 403/223; 403/179; 403/220; 403/341; 52/726.1; 52/726.2
(58) Field of Search ................................ 403/223, 220, 403/28, 229, 179, 341, 300, 303, 305, 314; 285/381; 52/726.1, 726.2, 740.1

(56) References Cited

U.S. PATENT DOCUMENTS

| | | | | |
|---|---|---|---|---|
| 3,039,800 A | * | 6/1962 | Morse et al. ................ | 403/341 |
| 3,576,055 A | * | 4/1971 | Gisbourne .................. | 403/355 |
| 3,886,700 A | * | 6/1975 | Lambert ..................... | 52/726.1 |
| 3,986,311 A | * | 10/1976 | Muhe et al. ................ | 52/726.1 |
| 4,035,007 A | * | 7/1977 | Harrison et al. ......... | 285/381.2 |
| 4,296,955 A | | 10/1981 | Martin | |
| 4,671,698 A | * | 6/1987 | Klingstedt .................. | 403/341 |
| 4,832,382 A | * | 5/1989 | Kapgan ...................... | 285/369 |
| 4,842,438 A | * | 6/1989 | Bortolin et al. ............. | 403/270 |
| 5,197,720 A | * | 3/1993 | Renz et al. ................ | 269/48.1 |
| 5,433,549 A | * | 7/1995 | McGaffigan ................ | 403/223 |
| 5,464,258 A | * | 11/1995 | Kornfeldt et al. ......... | 285/294.2 |
| 5,858,020 A | * | 1/1999 | Johnson et al. ............... | 606/78 |
| 6,257,593 B1 | * | 7/2001 | White ..................... | 285/381.3 |
| 6,530,564 B1 | * | 3/2003 | Julien ........................ | 267/147 |

FOREIGN PATENT DOCUMENTS

| | | | | |
|---|---|---|---|---|
| DE | 3007307 A1 | * | 7/1981 | ............. F16B/4/00 |
| EP | 296003 A1 | * | 12/1988 | .......... F16L/33/02 |
| NL | 10214 A | * | 9/1923 | |
| WO | WO 89/12175 | | 12/1989 | |
| WO | WO 96/27744 | | 9/1996 | |

OTHER PUBLICATIONS

Engineering Aspects of Shape Memory Alloys, Duerig, Melton, Stockel, Wayman, Verlag Butterworth–Heinemann Ltd., 1990, pp. 137–148 and pp. 158–169.
T. W. Duerig and A. R. Pelton, Ti–Ni Shape Memory Alloys, Materials Properties Handbook: Titanium Alloys, 1994, pp. 1035–1048.

* cited by examiner

*Primary Examiner*—Daniel P. Stodola
*Assistant Examiner*—Ernesto Garcia
(74) *Attorney, Agent, or Firm*—Venable LLP; Catherine M. Voorhees

(57) ABSTRACT

The invention relates to connecting elements for mechanically connecting constructive elements (2, 3). It is proposed to use an elastically deformable tensioning element (10), comprising a spring material consisting of a superelastic shape memory alloy, in particular a nickel-titanium alloy, elastically expanded in the tensioning element (10).

11 Claims, 11 Drawing Sheets

MECHANICAL CONNECTING ELEMENT

BACKGROUND OF THE INVENTION

1) Field of the Invention

The invention relates to a connecting element for mechanically connecting constructive elements. It comprises an elastically deformable tensioning element which applies a holding force in its elastically deformed state, onto at least one constructive element connected by the connecting element, thus generating a nonpositive connection of at least one constructive element with the tensioning element or with another constructive element. In particular, the invention relates to the linking of longitudinal, wire-shaped constructive elements as e.g. profiles and tubes, also with small diameters in the range of a few millimeters or less. A connection is to be understood as the joint of a tensioning element to a constructive element to be connected, or the connection of two or more constructive elements to each other. In particular, the invention relates to the mechanical-connection of constructive elements consisting of a material which is difficult to weld or to solder, e.g. a nickel-titanium alloy.

2) Description of the Related Art

In many ranges of technology, there is the requirement to connect constructive elements mechanically, however, connections which allow detachment if necessary, are desired, too. A usual method is to use an elastically deformable tensioning element which applies a holding force in its elastically deformed state, onto one constructive element to be connected, thus generating a nonpositive connection of at least one constructive element with the tensioning element or with another constructive element. Principally, there are two ways of deforming the tensioning element elastically.

The first variant is to bring the tensioning element from a relaxed initial position into a pre-tensioned position by means of an elastic deformation, where it is deformed and elastically expanded. In the pre-tensioned position, the constructive element to be connected (at least one) can be inserted into the tensioning element (or, if necessary, vice versa, the tensioning element into the constructive element). After that, the tensioning element is allowed to return to a less tensioned position, where it applies a holding force, caused by the elastic deformation, onto the connected constructive element. This holding force generates the nonpositive connection.

The second possibility is to bring the tensioning element from its relaxed initial position into a tensioned position, where the mechanical tension generated by the expansion causes the holding force. The tensioning element can be pre-tensioned in an opposite direction before the insertion of the constructive element to be connected, if necessary.

Thus, as to the state of the art, it is known to fit coil springs made of steel to the ends of Allan keys; these coil springs are wound around the tip of the key in a way that the coil spring fixes the key in a non-positive way due to the spring load. With this, the key can be fixed to a bunch of keys by means of the coil spring. According to the first described variant, the coil spring is expanded for inserting the Allen key, and generates the holding force in a partially relaxed position. On the other hand, the coil spring can also be applied to the key by the second described variant, being contracted and decreasing the diameter, which presents similarities with crimping; this, too, generates a holding force by the winding around the key end.

Another known example from the state of the art are shrinking joint sleeves for the butt joining of tubes, e.g. according to the literature reference Engineering Aspects of Shape Memory Alloys, Duerig, Melton, Stöckel, Wayman, Verlag Butterworh-Heinemann Ltd., 1990 or according to DE 4026644 C1. Here, a shape memory alloy in form of a sleeve, with a suppressed shape memory effect, is located around the joint and shrunk. The entire usable shrinking effect amounts to approximately three to four percent after subtracting the installation tolerance, the substrate tolerance, the substrate deformation during shrinking and the suppressed shape memory effect; this makes it necessary to comply exactly with the tolerances in order to generate a reliable joint. These shrunk joints are based on a one-way effect, this means that the joints cannot be detached any more. The effect applied for joining during the shrinking process is based on a phase transformation, during which the metallographic structure of the shrinking sleeve changes.

SUMMARY OF THE INVENTION

Taking into account this state of the art, the invention relates to the creation of a connecting element for mechanically connecting constructive elements, which allows bigger tolerances and dimensional deviations for the tensioning element and/or the constructive elements, but at the same time creates a high holding force. The strength of the connection and the generated holding force must be high. Furthermore, it is desirable to detach the realized connection if necessary.

The solution according to the invention, for a connecting element for mechanically connecting constructive elements, comprising an elastically deformable tensioning element adapted to apply a holding force in its elastically expanded state, onto at least one constructive element connected by the connecting element, thus generating a nonpositive (frictional) connection of at least one constructive element with the tensioning element or with another constructive element, consists of the fact that the tensioning element comprises a spring material made of a superelastic shape memory alloy, in particular a nickel-titanium alloy, which is expanded elastically (purely elastically, superelastically) in the tensioning element.

For alloys containing a similar amount of titanium and nickel atoms, particular effects can be observed. Due to these effects, such alloys are also designated shape memory alloys. These effects are based on thermoelastic martensitic phase transformation, i.e. a temperature-dependent modification of the crystalline structure: at high temperatures, the alloy is austenitic, at low temperature, however, it is martensitic. According to T. W. Duerig and H. R. Pelton, ("TI-NI Shape Memory Alloys", in: Materials Properties Handbook: Titanium Alloys, 1994, pages 1035–1048, ASM International 1994), two characteristics have to be distinguished for shape memory alloys. Alloys with a titanium content between 49.7 to 50.7 atom % show a thermal shape memory, also designated shape memory; whereas alloys with a titanium content of 49.0 to 49.4 atom % show a mechanical shape memory, also designated superelasticity. Not only binary nickel-titanium alloys can have the stated properties. A shape memory alloy can contain ternary ingredients (e.g. iron, chrome or aluminum). The relation of nickel and titanium, as well as the existence of ternary ingredients, has a big influence on the intensity of the thermal and mechanical shape memory.

In order to use the thermical shape memory for constructive elements as e.g. the shrinking sleeves described above, an alloy with adequate composition is converted diffusionlessly from the austenitic crystalline structure to the martensitic crystalline structure by cooling down. A subsequent deformation of a constructive element made of this alloy can be reversed by a thermal treatment of that constructive element (heating to a temperature above a certain conversion temperature). This recovers the initial austenitic crystalline structure and the constructive element returns to its original shape. The conversion temperature is generally understood as the temperature at which the martensite has completely converted to austenite. The conversion temperature strongly depends on the composition of the alloy and on the internal tensions of the constructive element. Constructive elements which have a thermal shape memory can perform movements and/or apply forces.

For a constructive element with austenitic crystalline structure, the mechanical shape memory effect appears when the constructive element is deformed in a certain temperature range. For this, it is energetically more favorable for the austenitic crystalline structure, to convert to martensite in a tension-induced way, whereby elastic expansions of up to 10% can be obtained. When unloaded, the crystalline structure returns to the austenitic phase. Therefore, constructive elements made of such alloys are used for the storage of deformation energy.

Alloys showing the characteristics described above are known by the designations of Nickel-Titanium, Titanium-Nickel, Tee-nee, Memorite$^R$, Nitinol, Tinel$^R$, Flexon$^R$, Euroflex$^R$ and Shape Memory Alloys. These terms do not refer to a single alloy with a certain composition, but to a family of alloys showing the described characteristics.

Due to the particular properties of nickel-titanium alloys, there is a high interest in many fields of technology, e.g. medical engineering and precision mechanics, in the application of constructive elements made of shape memory alloys, also in form of tubes, in particular with small outer diameter. In mechanics, they can e.g. be used for switching elements, setting elements or valves. In medical engineering, too, shape memory alloys are increasingly applied, as constructive elements made of such alloys are bio-compatible and fatigue-resistant, and because they show high buckling resistance in case of superelastic alloys. Examples for the application of nickel-titanium alloys in medical engineering are guidance wires for catheters, vessel supports (stents), as well as endoscopic and laparoscopic instruments for the minimal invasive diagnosis and therapy.

The special characteristic of superelastic shape memory alloys, consisting in achieving elastic expansions of up to ten percent, thus significantly higher than for spring materials made of steel or bronze, is applied in the scope of the invention, in order to use tensioning elements which are elastically expanded, made of such spring material. As the elastic expansion range is ten times higher as compared to a spring steel, the tolerances of invention-related tensioning elements can be bigger dimensioned.

The usable effect of the invention-related tensioning element is increased by the factor of three approximately, as compared to a shrinking sleeve made of a shape memory alloy as described above. During installation, such a shrinking sleeve is in martensitic state and converts to austenitic state when heated. The shrinking sleeve tries to restore the initial, smaller shape, thus generating the holding force.

The tensioning element according to the invention is in austenitic state already at the start of the installation and converts to the tension-induced, martensitic state during the elastic tensioning or expanding, respectively. Due to the geometric shape of the tensioning element, the usable effect can be increased by the factor three approximately, as compared to the known shrinking sleeve. In general, for an invention-related tensioning element, no elongation effects, i.e. shrinking effects, occur for the generation of the cohesive force, but merely bending forces or shear forces.

BRIEF DESCRIPTION OF THE DRAWINGS

The following embodiments of the invention show further advantageous features and specialties; these are further described and explained with the schematic representation in the drawings, as follows.

DETAILED DESCRIPTION OF THE INVENTION

FIGS. 1–6 show lateral views of connecting elements according to the invention, the tensioning element of which comprises a helicoidal spring 1, 4, 7, into which is inserted, in axial direction, at least one constructive element 2 to be connected. For this, the spring can be elastically deformed and pre-tensioned for inserting at least one constructive element into it, being partially relaxed for realizing the connection, or the spring will be tensioned in order to realize the connection. Furthermore it may be necessary to turn open the coil of the spring for increasing the diameter of the coil when inserting the mentioned at least one constructive element.

Figure 1:
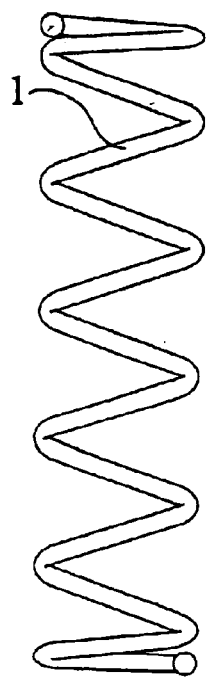
FIG. 1 shows a tensioning element according to the invention in form of a compression spring.
Figure 2:
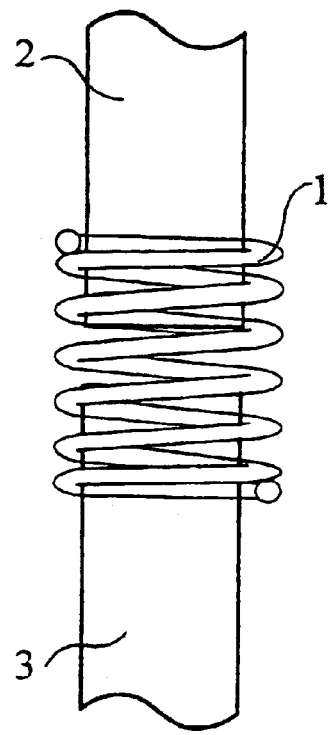
FIG. 2 shows a compression spring during assembly.
Figure 3:
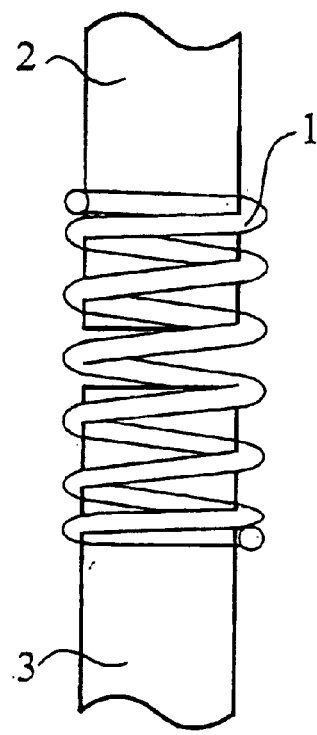
FIG. 3 shows a connecting element according to the invention with a compression spring.

In FIGS. 1–3, the tensioning element is a compression spring 1. In FIG. 1, it is illustrated in relaxed state. It consists of a shape memory alloy with superelastic characteristics. In order to connect two or more wire-shaped constructive elements 2, 3 at their face ends, the compression spring 1 will be compressed in axial direction and pre-tensioned when inserting the constructive elements 2, 3. This increases the diameter of the spring, so the parts to be connected can be inserted as shown in FIG. 2. The constructive elements 2, 3 are pressed together at their face ends; this is not illustrated in the figures for reasons of clearness.

After that, the compression spring is partially relaxed as illustrated in FIG. 3, whereby it expands again in longitudinal direction, trying to reach its initial, smaller diameter. This is inhibited, as the diameter of the constructive elements 2, 3 to be connected is bigger than the initial internal diameter of the spring which it now aims to restore. This partial relaxation causes a contact pressure of the compression spring 1 onto the constructive elements 2, 3, with the compression spring now in tight contact to the constructive elements 2, 3 to be connected, generating the desired holding forces of the joint connection. The constructive elements 2, 3 to be connected at their front ends, are drawn with a gap in FIG. 3, for better presentability. For detaching the connection, the pressure spring 1 can once again be pressed into a shape according to FIG. 2, thus enabling to pull out the constructive elements 2, 3.

Figure 4:
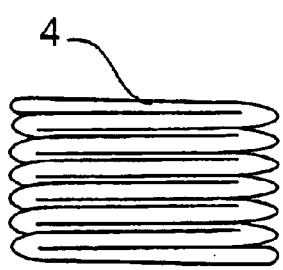
FIG. 4 shows a tensioning element according to the invention in form of a tension spring.
Figure 5:
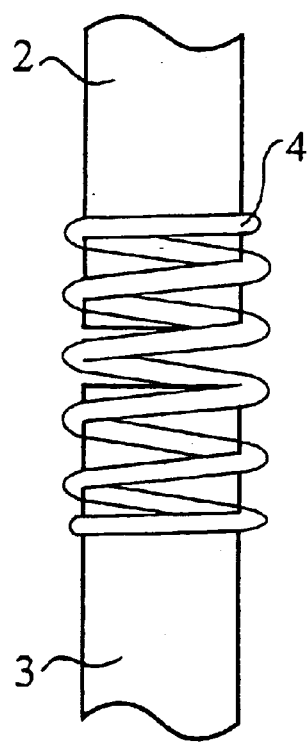
FIG. 5 shows a tension spring during assembly.
Figure 6:
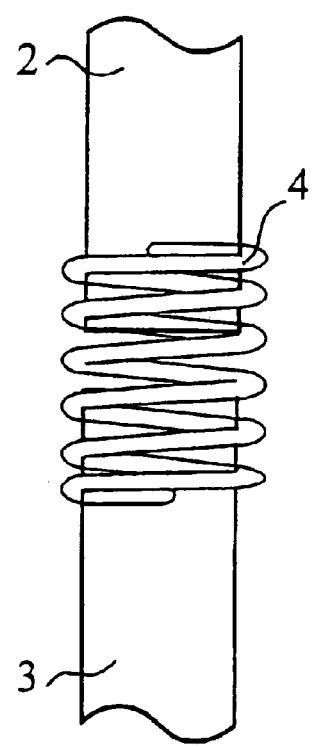
FIG. 6 shows a connecting element according to the invention with a tension spring.

FIGS. 4–6 show a connection of two constructive elements 2, 3, realized by a tension spring 4, shown in FIG. 4 in relaxed state, made of a superelastic shape memory material. The tension spring is preferably wound to a block, i.e. winding next to winding. For inserting the two or more constructive elements 2, 3, the windings are opened a little, so that the diameter of the windings becomes a little bigger, and stretched in axial direction at the same time. The constructive elements 2, 3 will be pushed together with their face ends, not shown in FIG. 5 for a better presentability, and the tension spring 4 will be partially relaxed. Then, it adapts a state according to FIG. 6, where its diameter as well as its length are increased as compared to the initial state illustrated in FIG. 4, and decreased as compared with the state according to FIG. 5. This generates a contact pressure onto the inserted constructive elements 2, 3, causing the desired holding forces of the joint connection.

Figure 7:
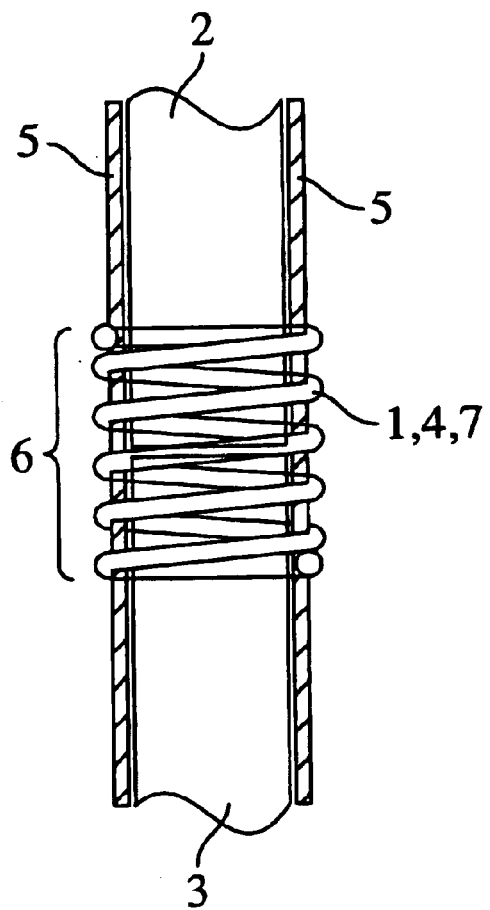
FIG. 7 shows a connecting element according to the invention with a spring and a joint element.

FIG. 7 illustrates a cross section through a connecting element according to the invention with a spring, which can be a compression spring 1, a tension spring 4, or a leg spring 7, described further below. Two or more constructive elements 2, 3 are inserted into the spring, with their face ends joined, being connected to each other by the spring. The two constructive elements 2, 3 contact each other with their face ends in the range of the spring 1, 4, 7, or are oriented to each other with their face ends. The constructive elements 2, 3 are preferably rod-shaped or tube-shaped and preferably have a circular cross section. However, other cross sections, e.g. rectangular or square cross sections, are possible, too.

Alternatively, it is possible that the spring 1, 4, 7 is not wound around two constructive elements 2, 3 joined together, but around a core consisting of one piece, so that only one constructive element to be connected is inserted into the spring. The inserted constructive element can then be connected to another element by means of the spring, e.g. with one leg of the spring.

Another advantageous feature shown in FIG. 7 can consist in the fact that the two or more constructive elements 2, 3 are surrounded, in the range of their contact point, by a joint element, e.g. a joint tube 5 with thin walls or various joint shells, transferring the holding force of the spring to the constructive elements 2, 3 to be connected.

If the surfaces of the constructive elements 2, 3 to be connected, or those of a single-piece core, respectively, are very smooth, it can be advantageous to increase the holding forces by increasing the friction of a section 6 of at least one constructive element to be connected and inserted into the spring, being engaged with the tensioning element, i.e., the spring, by e.g. raising, structuring or coating. In special designs, it may occur that two or more constructive elements 2, 3 to be connected, are arranged parallel to each other within a section 6 of the spring.

Figure 8:
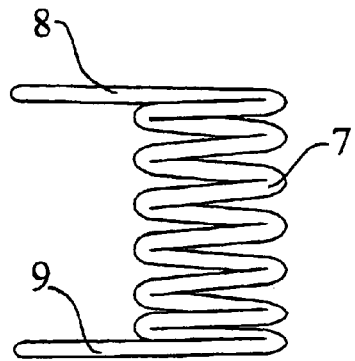
FIG. 8 shows a tensioning element according to the invention in form of a leg spring.

FIGS. 8–11 show embodiments of connecting elements according to the invention, the tensioning element of which being a leg spring 7 shown relaxed in FIG. 8, with two legs 8, 9, consisting of a superelastic shape memory alloy. It can be used in a way similar to the compression springs 1 and tension springs 4 described above, whereas the particularities further explained as to FIG. 7, e.g. one-piece cores, joint elements and friction-increasing sections are possible here, too.

Figure 9:
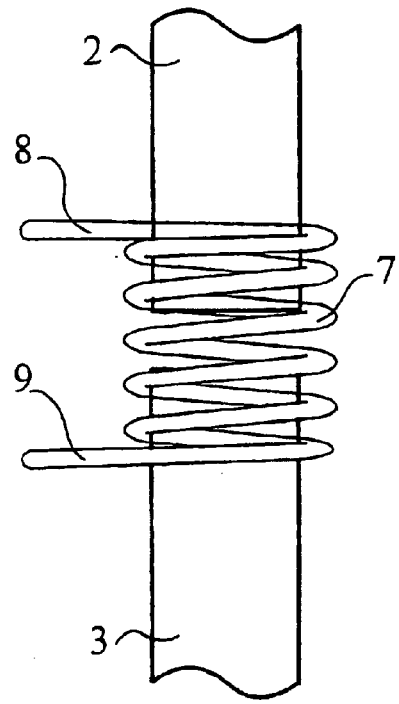
FIG. 9 shows a leg spring during assembly.
Figure 10:
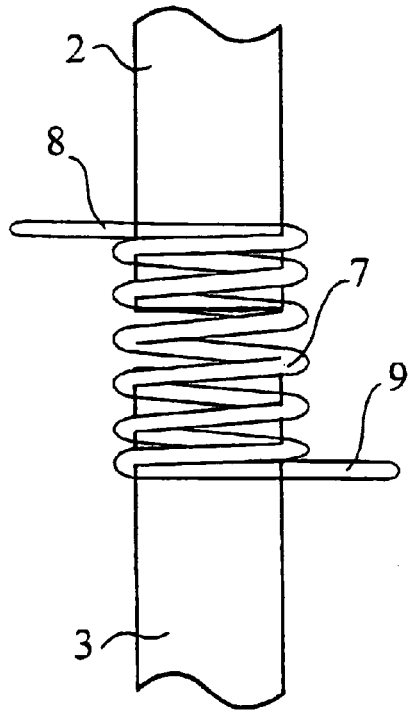
FIG. 10 shows a first connecting element according to the invention with a leg spring.

According to a first variant illustrated in FIGS. 9 and 10, the legs 8, 9 of the leg spring 7 are bent up during the insertion of at least one of the constructive elements 2, 3, in order to increase the diameter of its windings and for pre-tensioning of the leg spring 7 against the direction of winding of the leg spring 7. The legs 8, 9 of the leg spring 7 then are transposed to each other by a certain transposition angle. After inserting the constructive elements 2, 3 to be connected into the leg spring 7, the leg spring 7 is partially relaxed for realizing the connection; it adopts a state according to FIG. 10. By this, the diameter of its coils decreases and the desired holding force onto the inserted constructive elements 2, 3 is obtained.

As an alternative, it is also possible, starting from the relaxed state of the leg spring 7 according to FIG. 8, or starting from the pre-tensioned state of the leg spring 7 according to FIG. 9, to bend together in winding direction of the leg spring, exceeding the relaxed state, the legs 8, 9 of the leg spring 7, after the insertion of the constructive elements 2, 3 to be connected, for a decrease of the diameter of its windings, to obtain the connection. By this, the leg spring 7 is tensioned and decreases its pitch, which can be set forth until block formation, and decreases its diameter.

The diameter decrease is partially inhibited, however, by the inserted constructive elements 2, 3, as soon as the inner diameter of the leg spring 7 comes in contact with the parts to be connected. This produces a contact pressure which obtains the desired holding forces of the joint connection. According as the leg spring 7 is or is not bent up in an intermediate step according to FIG. 9, constructive elements 2, 3 with a diameter bigger or smaller than the winding diameter, can be inserted into the leg spring 7.

Figure 11:
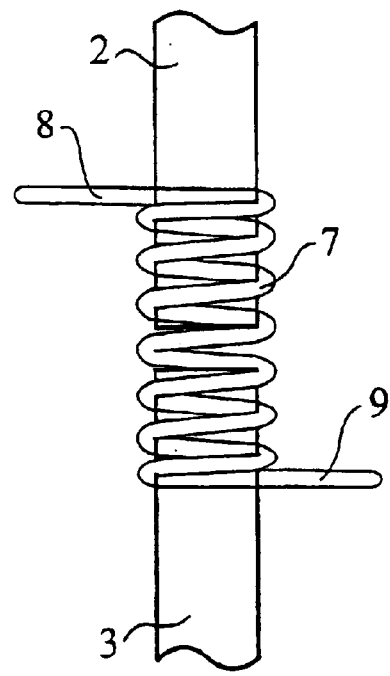
FIG. 11 shows a second connecting element according to the invention with a leg spring.

For the variant illustrated in FIG. 11, the constructive elements 2, 3, the diameter of which is smaller than the leg spring 7, are inserted in an initial position according to FIG. 8, and the legs 8, 9 are bent together in winding direction of the spring. Preferably, the legs 8, 9 are bent together until they reach a parallel orientation. This makes it easier to fix the legs 8, 9 with respect to each other, thus assuring the maintenance of the spring tension.

For this, the legs 8, 9 can be located, e.g. side by side, and fixed with a section of a spring tube, pushed over the leg ends 8, 9, preferably consisting of a superelastic shape memory material, thus corresponding to a clamping sleeve, described hereafter. At the same time, one or more further pieces can be introduced and also joined into the other end of the sleeve, fixing the tensioned legs 8, 9 of the leg spring 7.

Figure 12:
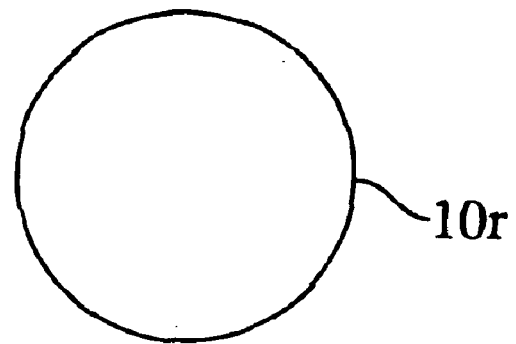
FIG. 12 shows a first connecting element according to the invention in form of a clamping sleeve.

FIGS. 12–15 illustrate a first connecting element according to the invention which comprises a tensioning sleeve made of a superelastic shape memory material as the connecting element. FIG. 12 illustrates a cross section through the clamping sleeve. In its relaxed state, it preferably shows a circular cross section (FIG. 12-$10_r$); in the pre-tensioned state according to FIG. 13 ($10_{pt}$), and in the partially relaxed state according to FIG. 14 ($10_{pr}$), it presents an oval cross section.

Figure 13:
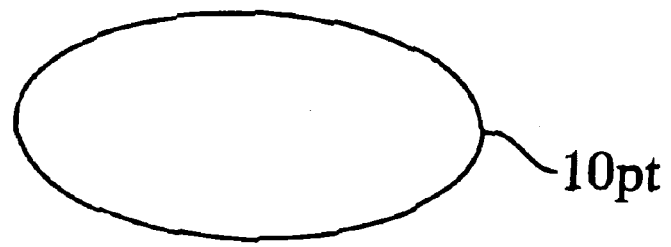
FIG. 13 shows a pre-tensioned clamping sleeve as to FIG. 12.

For the insertion, in axial direction, of the constructive elements 2, 3 to be connected, into the clamping sleeve, it is necessary to bring the clamping sleeve $10_r$ from the position illustrated in FIG. 12, to the oval to form $10_{pt}$ according to FIG. 13, by compressing it. Hereby, the clamping sleeve $10_{pt}$ is elastically deformed and pretensioned. In this state, both constructive elements 2, 3 to be connected are inserted, according to the cross section in FIG. 14; after that, the clamping sleeve $10_{pr}$ is relaxed.

The unloading partially relaxes the clamping sleeve $10_{pt}$ as it aspires to recover its initial, round state. This, however, is partially impeded, as the inserted constructive elements 2, 3 together have a dimension that is bigger than the initial inner diameter of the relaxed clamping sleeve $10_r$. This generates a force pressing together the constructive elements 2, 3 to be connected, joining them reliably. For detaching the connection, the clamping sleeve $10_{pr}$ can once again be pressed into a shape according to FIG. 13, bringing it into a pre-tensioned state ($10_{pt}$), enabling to pull out the constructive elements 2, 3.

As compared to a conventional spring steel or a spring bronze, which allow a maximum elastic expansion of 0.5%, the clamping sleeve according to the invention, consisting of a superelastic shape memory, offers the advantage to allow up to 8% or more of elastic expansion. Thus, it is possible to allow bigger tolerances, whereas, e.g., half of the usable expansion range can be applied for the manufacturing tolerances and the other half can be applied for the maintenance of the elastic deformation and the generation of the holding forces.

Also as compared to the known shrinking sleeves consisting of shape memory alloys, used for shrinking connections, the clamping sleeves according to the invention offer essential advantages, as they allow bigger tolerances and dimensional deviations without affecting the function. For example, a pre-expanded shrinking sleeve of an inner diameter of 0.80 mm, can be shrunk to an inner diameter of 0.76 mm as a maximum. On the other hand, a round, superelastic tube section of a clamping sleeve 10 with an inner diameter of 0.80 mm can be compressed to an inner diameter of 0.47 mm without a permanent deformation of the pre-tensioned tube. The holding forces for this are generated by elastic deformations, bending forces and expansions.

Figure 14:
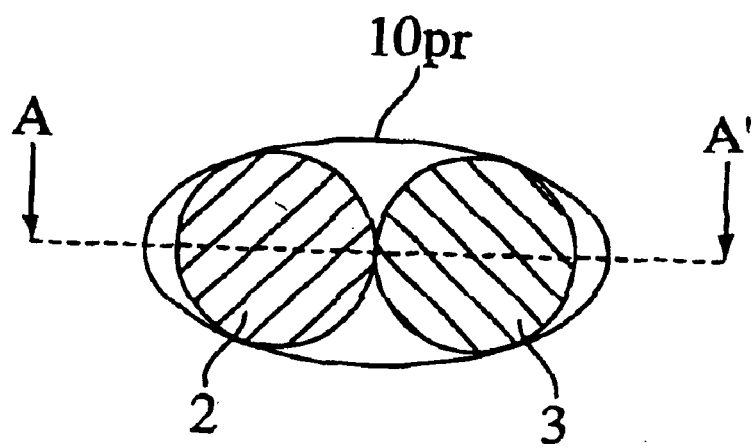
FIG. 14 shows a cross section of a first connecting element according to the invention with a clamping sleeve.

In the embodiment according to the FIGS. 12–14, the outer diameter of the clamping sleeve $10_r$ in its initial or relaxed state is 1.00 mm according to FIG. 12, and the inner diameter is 0.82 mm. In the pre-tensioned state according to FIG. 13 ($10_{pt}$), the large outer diameter is 1.62 mm, the large inner diameter is 1.44 mm, the small outer diameter is 0.64 mm and the small inner diameter is 0.46 mm. The diameter of the two constructive elements 2, 3 is 0.45 mm each, so that the clamping sleeve $10_{pr}$ according to FIG. 14, shows the following dimensions in the partially relaxed state: large outer diameter 1.10 mm, large inner diameter 0.92 mm, small outer diameter 0.90 mm and small inner diameter 0.72 mm.

Figure 15:
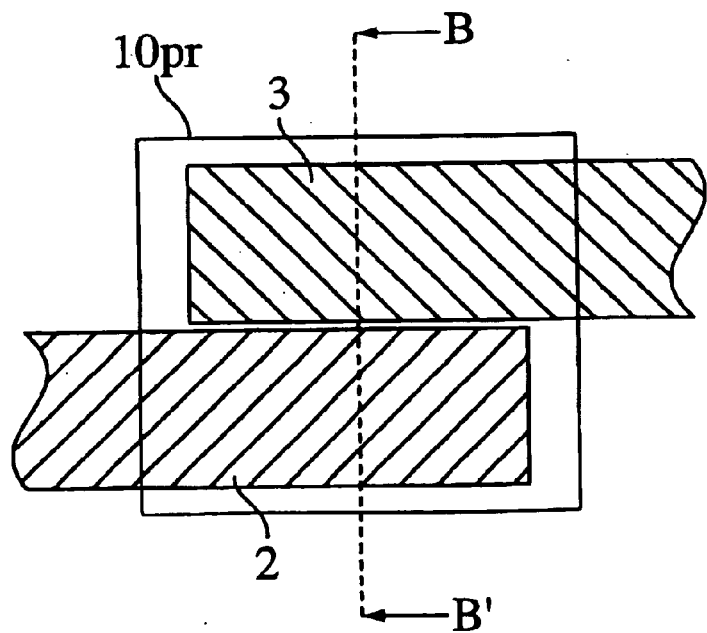
FIG. 15 shows a longitudinal section as to FIG. 14.

FIG. 15 illustrates a section A–A' according to FIG. 14. The section B–B' corresponds to the representation in FIG. 14. It can be seen that the constructive elements 2, 3 to be connected, are inserted into the tube-shaped clamping sleeve $10_{pr}$; the constructive elements are arranged parallel to each other in a section of clamping sleeve $10_{pr}$. As an alternative, more than two constructive elements to be connected, can be inserted into the clamping sleeve. Furthermore, embodiments are possible, in which two or more constructive elements 2, 3 to be connected, are inserted, which contact each other with their face ends in the clamping sleeve, or which are oriented with their ends facing to each other.

The respective ends of the connected constructive elements 2, 3 can be inside of the clamping sleeve $10_{pr}$, as shown in FIG. 15, or stick out of the clamping sleeve. The holding force generated by the clamping sleeve is determined by the mechanical material properties, the dimensions, the geometric conditions and the surface structure. If the clamping sleeve has a corresponding length, it can achieve a tensile strength of the connection which is higher than that of the connected constructive elements 2, 3.

Figure 16:
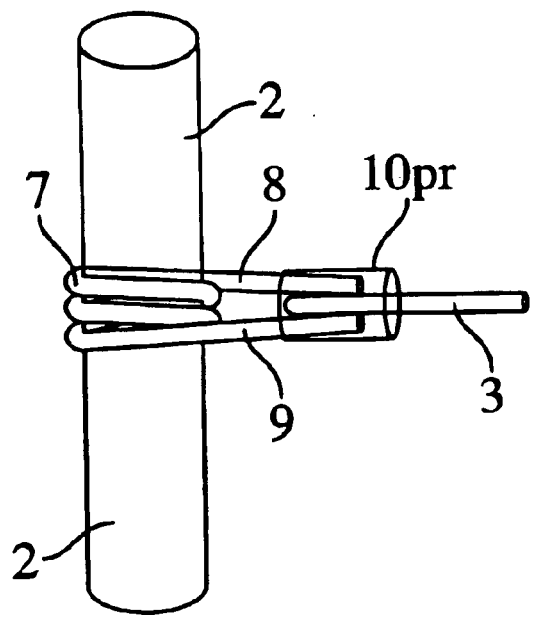
FIG. 16 shows a first invention-related connecting element with leg spring and clamping sleeve.

FIG. 16 illustrates a connecting element fulfilling the function of a T-junction. A leg spring 7 is wound around a constructive element 2; the legs 8, 9 of the leg spring 7 are fixed with a clamping sleeve $10_{pr}$. This procedure generates a fixed connection of the leg spring 7 and the constructive element 2. A further constructive element 3 is inserted in the clamping sleeve $10_{pr}$, and fixed together with the legs 8, 9. It is held, together with the legs 8, 9, by the clamping sleeve $10_{pr}$ by means of elastic deformation forces.

Figure 17:
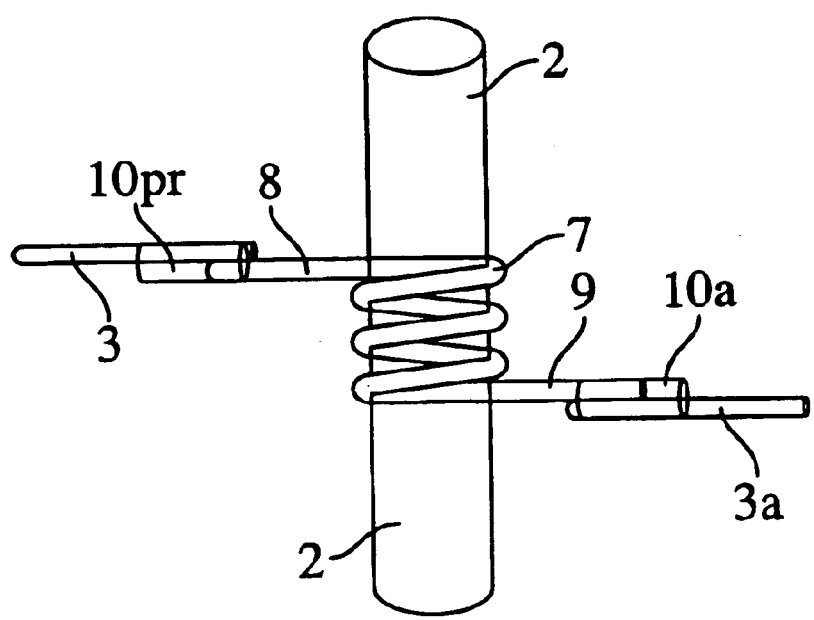
FIG. 17 shows a second connecting element according to the invention with leg spring and clamping sleeve.
Figure 18:
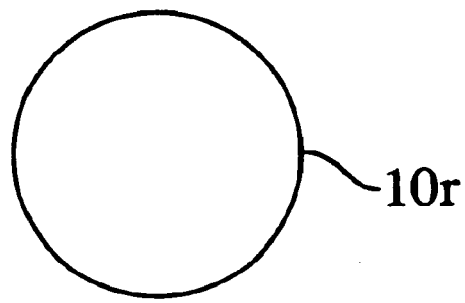
FIG. 18 shows a second connecting element according to the invention in form of a clamping sleeve.
Figure 19:
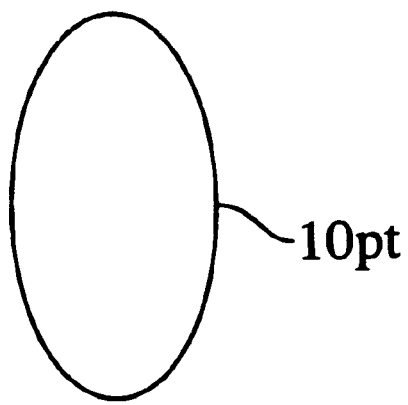
FIG. 19 shows a pre-tensioned clamping sleeve as to FIG. 18.
Figure 20:
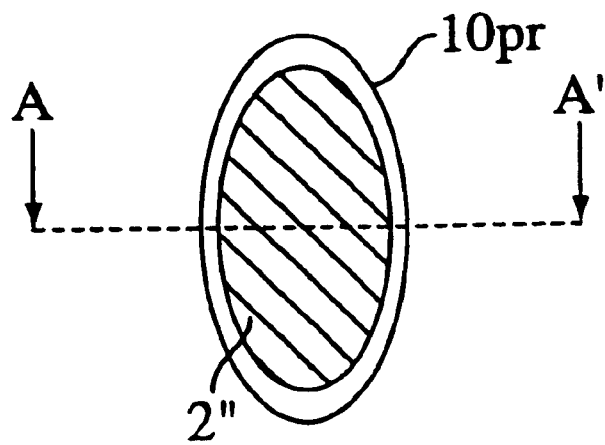
FIG. 20 shows a cross section of a second connecting element according to the invention element with a clamping sleeve.
Figure 21:
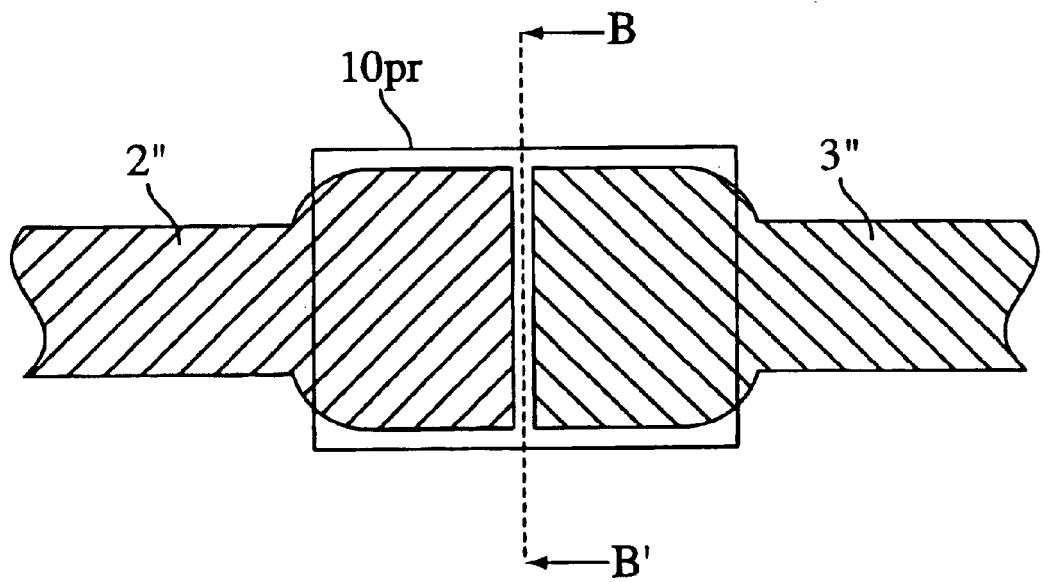
FIG. 21 shows a longitudinal section as to FIG. 20.
Figure 25:
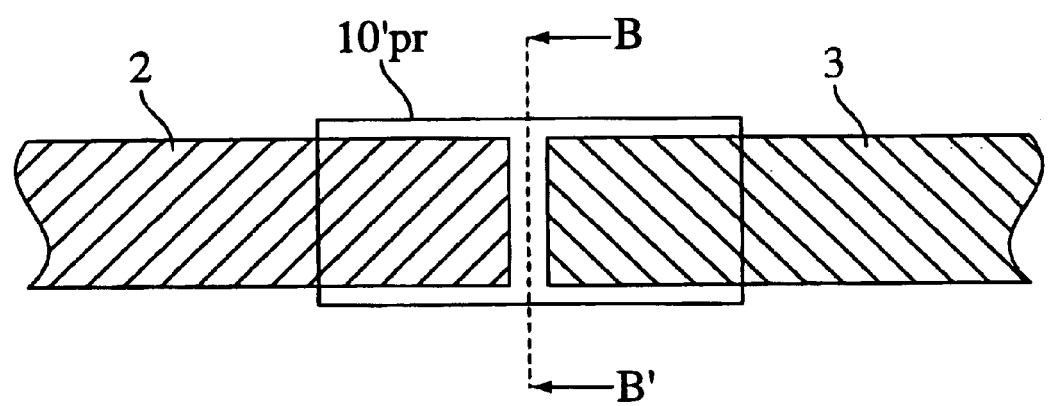
FIG. 25 shows a longitudinal section as to FIG. 24.
Figure 22:
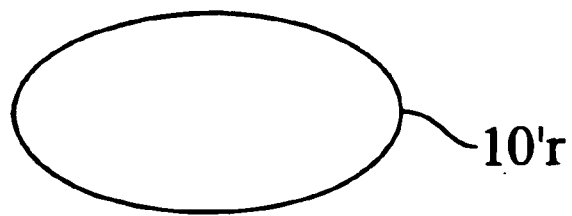
FIG. 22 shows a third connecting element according to the invention in form of a clamping sleeve.
Figure 23:
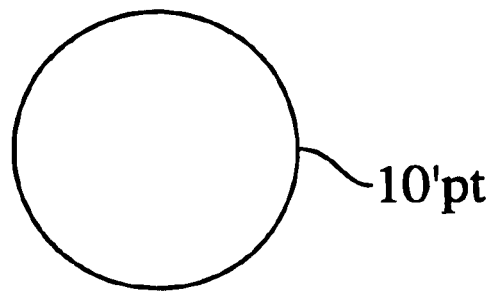
FIG. 23 shows a pre-tensioned clamping sleeve as to FIG. 22.
Figure 24:
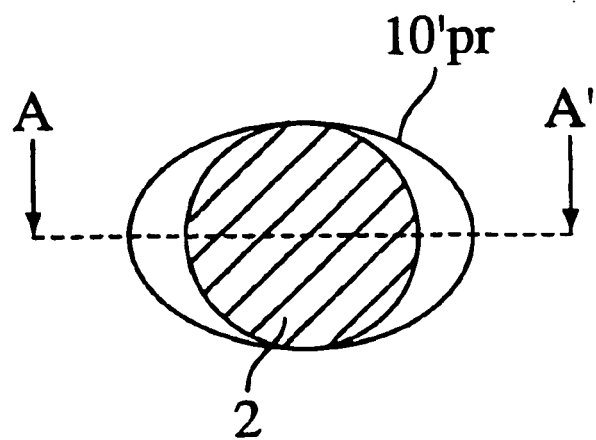
FIG. 24 shows a cross section of a third connecting element according to the invention with a clamping sleeve.
Figure 26:
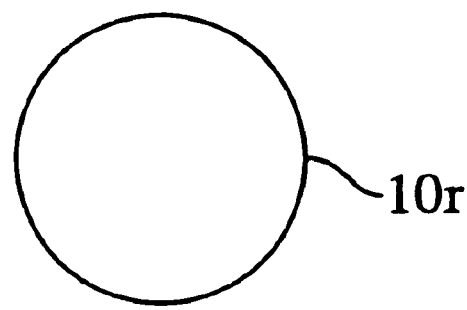
FIG. 26 shows a fourth connecting element according to the invention in form of a clamping sleeve.
Figure 27:
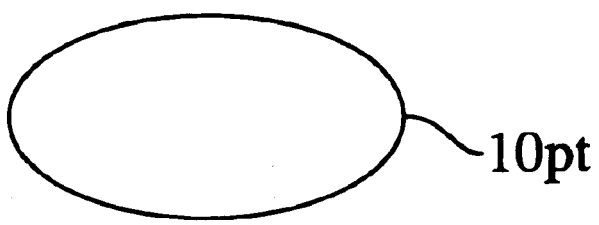
FIG. 27 shows a pre-tensioned clamping sleeve as to FIG. 26.
Figure 28:
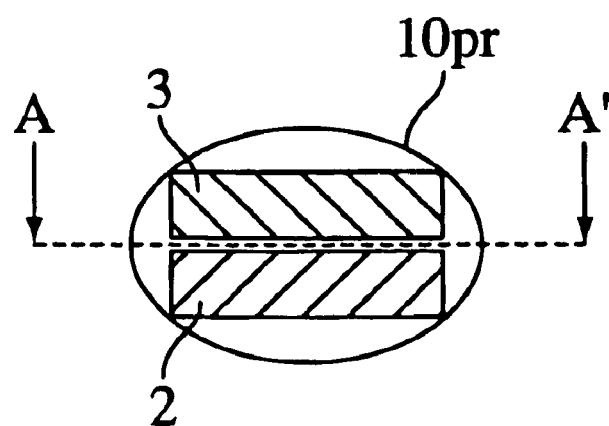
FIG. 28 shows a cross section of a fourth connecting element according to the invention with a clamping sleeve.
Figure 29:
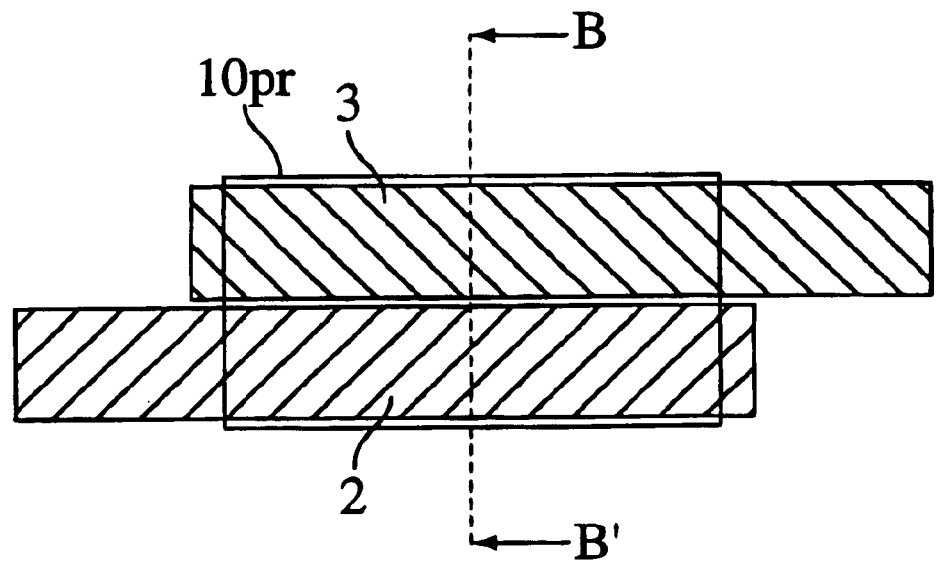
FIG. 29 shows a longitudinal section as to FIG. 28.
Figure 33:
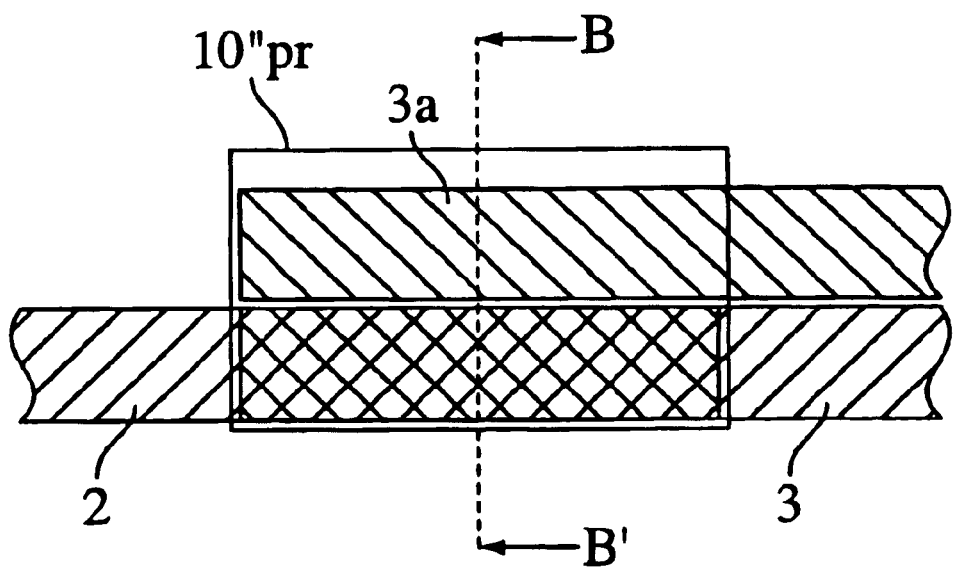
FIG. 33 shows a longitudinal section as to FIG. 32.
Figure 30:
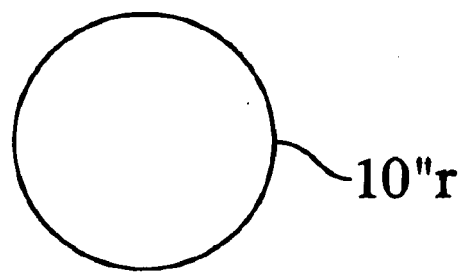
FIG. 30 shows a fifth connecting element according to the invention in form of a clamping sleeve.
Figure 31:
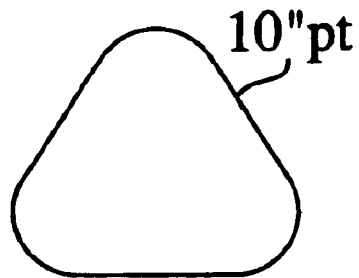
FIG. 31 shows a pre-tensioned clamping sleeve as to FIG. 30.
Figure 32:
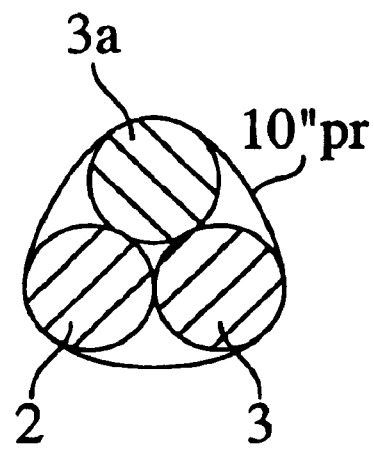
FIG. 32 shows a cross section of a fifth connecting element according to the invention with a clamping sleeve.

In FIG. 17, a leg spring 7 is wound around a constructive element 2 and connected to it, e.g., as described in FIGS. 10 and 11. One of the legs 8 is connected to a further constructive element 3 with a clamping sleeve $10_{pr}$; the other leg 9 is connected to a further constructive element 3a with a clamping sleeve 10a. By this, it is possible to generate cross junctions.

FIGS. 18–21 correspond to the FIGS. 12–15 and show a second connecting element according to the invention, featuring a clamping sleeve with two or more constructive elements 2, 3 to be connected, inserted; these constructive elements can contact each other with their face ends in the clamping sleeve, or are oriented with their ends facing to each other. In its relaxed state (FIG. 18), the clamping sleeve $10_r$ can show a circular cross section, and in the pre-tensioned state (FIG. 19-$10_{pt}$), and in the partially relaxed state (FIG. 20-$10_{pr}$), an oval cross section. In this example, the cross section of the parts (2", 3") to be joined is oval.

FIGS. 22–25 correspond to the FIGS. 12–15 and show a third connecting element according to the invention, featuring a clamping sleeve with two constructive elements 2, 3 inserted; these constructive elements are oriented with their ends facing to each other. In its relaxed state (FIG. 22), the clamping sleeve $10'_r$ can show an oval cross section, in the pre-tensioned state (FIG. 23-$10'_{pt}$), it can show a deformed state as compared to the relaxed state, e.g. a circular or oval cross section, and in the partially relaxed state (FIG. 24-$10'_{pr}$), an oval cross section. In this example, the cross section of the constructive elements 2, 3 to be joined is circular.

FIGS. 26–29 correspond to the FIGS. 12–15 and show a fourth connecting element according to the invention, featuring a clamping sleeve with two constructive elements 2', 3' to be connected, inserted; these constructive elements are arranged parallel to each other within a section of the clamping sleeve. In its relaxed state (FIG. 26), the clamping sleeve $10_r$ can show a circular cross section, and in the pre-tensioned state (FIG. 27-$10_{pt}$), and in the partially relaxed state (FIG. 28-$10_{pr}$), an oval cross section. In this example, the cross section of the constructive elements 2', 3' to be joined is rectangular.

FIGS. 30–33 correspond to the FIGS. 12–15 and show a fifth connecting element according to the invention, featuring a clamping sleeve with three constructive elements 2, 3, 3a to be connected, inserted; these constructive elements are arranged parallel to each other within a section of the clamping sleeve. In its relaxed state (FIG. 30), the clamping sleeve $10"_r$ can show a circular or oval cross section, in the pre-tensioned state (FIG. 31-$10"_{pt}$), it can show a cross section deformed on three sides in radial direction, or a cross section flattened on three sides, respectively, and in the partially relaxed state (FIG. 32-$10"_{pr}$), a cross section arced on three sides. In this example, the cross section of the constructive elements 2, 3, 3a to be connected is circular.

List of Reference Signs

1 Compression spring
2 First constructive element
3 Second constructive element
3a Further constructive element
4 Tension spring
5 Joint tube
6 Section
7 Leg spring
8 First leg
9 Second leg
10 Clamping sleeve

What is claimed is:

1. A connecting element for mechanically connecting constructive elements, in combination with at least one constructive element, said connecting element comprising an elastically deformable tensioning element applying a holding force in an elastically expanded state onto the at least one constructive element, thus generating a frictional connection of said at least one constructive element with at least one of said tensioning element and another constructive element,
wherein
said tensioning element has a length in the axial direction, and comprises a spring material consisting of a superelastic shape memory alloy elastically expandable, said tensioning element being in a stress-induced martensitic state to produce the holding force, and wherein the tensioning element comprises a clamping sleeve, into which the at least one constructive element is inserted in the axial direction, whereby the clamping sleeve is elastically deformed and pre-tensioned by compression in order to insert the at least one constructive element, and the clamping sleeve is partially relaxed for realizing the connection.

2. The connecting element according to claim 1, wherein the superelastic shape memory alloy is a nickel-titanium alloy.

3. The connecting element according to claim 2, wherein the titanium content of the nickel-titanium is between about 49.7 to 50.7 atom %.

4. The connecting element according to claim 1, wherein the holding force is generated by at least one of bending forces and shear forces during an elastic expansion of the tensioning element.

5. The connecting element according to claim 1, wherein the holding force is a contact pressure generated by the elastic expansion of the tensioning element, the holding force being applied to the connected constructive element that is inserted into the tensioning element.

6. The connecting element according to claim 1, wherein the clamping sleeve has a circular cross section in a relaxed state, and an oval cross section in the pre-tensioned and in the partially relaxed state.

7. The connecting element according to claim 1, wherein the clamping sleeve has one of an oval cross section and a circular cross section in a relaxed state, and in the pre-tensioned state, a cross section that is deformed on three sides in a radial direction of the clamping sleeve, and the clamping sleeve has a cross section arced on three sides in the partially relaxed state.

8. The connecting element according to claim 1, wherein the another constructive element is at least a second constructive element to be connected so that at least two or more constructive elements to be connected are inserted in the clamping sleeve, the at least two constructive elements being arranged parallel to each other within a section of the clamping sleeve.

9. The connecting element according to claim 1, wherein the another constructive element is at least a second constructive element to be connected so that at least two or more constructive elements to be connected are inserted in the clamping sleeve, the at least two constructive elements to be connected at least one of contact each other with their face ends in the clamping sleeve, and are oriented with their face ends facing each other.

10. The connecting element according to claim 1, wherein the constructive element is inserted in the tensioning element, and a section of at least one constructive element is engaged with the tensioning element is friction-increased.

11. A connecting element for mechanically connecting constructive elements, said connecting element comprising an elastically deformable tensioning element adapted to apply a holding force in an elastically expanded state onto a constructive element that is to be connected, thus generating a frictional connection of said constructive element with at least one of said tensioning element and another constructive element,
wherein
said tensioning element has a length in the axial direction, comprises a clamping sleeve, into which the constructive element to be connected is to be inserted in the axial direction, and comprises a spring material consisting of a superelastic shape memory alloy elastically expandable, said tensioning element being in a stress-induced martensitic state to produce the holding force, and wherein the clamping sleeve has an oval cross section in the relaxed state, a deformed state, as compared to the relaxed state, in a pre-tensioned state, and an oval cross section in a partially relaxed state.

* * * * *